UNITED STATES PATENT OFFICE.

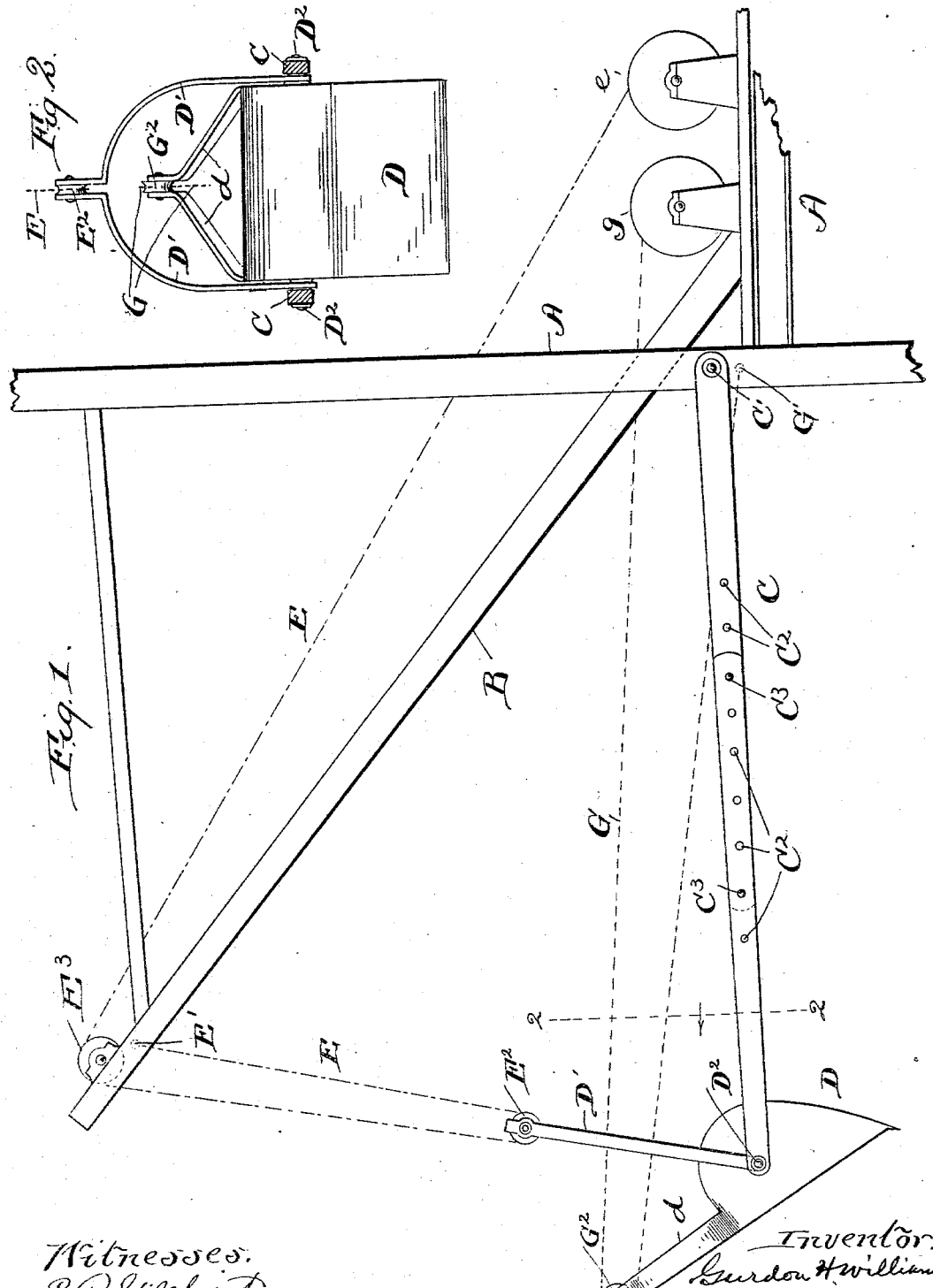

GURDON H. WILLIAMS, OF BROOKLYN, OHIO.

DERRICK OR CRANE.

SPECIFICATION forming part of Letters Patent No. 556,950, dated March 24, 1896.

Application filed February 4, 1895. Serial No. 537,209. (No model.)

*To all whom it may concern:*

Be it known that I, GURDON H. WILLIAMS, of South Brooklyn, in the county of Cuyahoga and State of Ohio, have invented certain new and useful Improvements in Derricks or Cranes; and I do hereby declare the following to be a full, clear, and exact description of the invention, such as will enable others skilled in the art to which it pertains to make and use the same.

My invention relates to improvements in derricks or cranes; and it consists in the combination, with the shovel or scoop of the machine, of the means employed for adjusting said shovel or scoop at the desired elevation and position relative to the ore or material to be scooped up and transferred, and in the means employed for actuating the shovel or scoop to dip into the ore or material and take up a load.

In the accompanying drawings, Figure 1 is a side elevation of a portion of a derrick or crane embodying my invention; and Fig. 2 is a vertical section on line 2 2, Fig. 1, looking in the direction of the arrow.

Referring to the drawings, A represents the body portion of the crane or derrick.

The derrick or crane comprises an outwardly and upwardly projecting boom B, and a suitable distance below the outer and central portion of said boom is another boom or pair of booms C C that are pivotally secured, as at C', to the body portion of the crane or derrick. I prefer the employment of two booms C C arranged side by side, as shown in Fig. 2. Booms C C at their outer ends support a scoop or shovel D, and are operatively connected with a cable E, that is operated by means of a winding-drum $e$, cable E being suitably secured to and at or near the upper end of boom B, as at E', thence leading downwardly to and over a pulley or sheave $E^2$ suitably supported by a bail D', between the end members whereof the shovel or scoop is pivotally supported. From pulley or sheave $E^2$ cable E returns upwardly to and over a pulley or sheave $E^3$ suitably supported from boom B in suitable proximity to point E', and from pulley or sheave $E^3$ the cable leads to the operating-drum $e$. The scoop or shovel is shown pivotally supported, as at $D^2$, between the two booms C C, and said booms and the scoop or shovel are capable of being elevated or lowered by means of drum $e$ and cable E as required to bring the scoop or shovel into proper position relative to the ore or material to be scooped up and transferred. The scoop or shovel having been brought into the position required relative to the material to be dipped into, as shown in Fig. 1, is then actuated by means of a cable G and a winding-drum $g$ in the direction required to dip into the material and fill the scoop or shovel, cable G being suitably secured to the body portion of the derrick or crane, preferably at or near the connection of beams C with said body portion, as at G', thence leading to and over a sheave or pulley $G^2$ suitably supported from a bail $d$ with which the scoop or shovel is provided, said bail being rigid with the scoop or shovel, and cable G leading from sheave or pulley $G^2$ to the operating-drum $g$. The arrangement of parts is such that the scoop or shovel, by rotating drum $g$ in the one direction, shall be actuated to dip into and take up a load, and shall dump by gravity when the operating-drum is rotated or free to rotate in the opposite direction.

I would here remark that in some cases it would be desirable to have booms C C adjustable endwise—that is, to have said booms so constructed that they could be lengthened or shortened at pleasure. This object is attained by making said booms in two sections, as shown, the sections being adapted to overlap each other and provided, respectively, with lateral holes $C^2$, with the arrangement of parts such that the holes in the sections are adapted to register with each other, so that when the outer sections are adjusted endwise of the inner sections to shorten or lengthen the booms said outer sections can be secured in the desired adjustment by means of pins $C^3$ placed or inserted in registering holes of the sections.

What I claim is—

In a crane or derrick, the combination with the body portion of the machine, boom B bearing pulley or sheave $E^3$, booms C C pivotally secured to the body portion, as at C', and shovel or scoop D pivotally secured to and between booms C C, said scoop or shovel being provided with sheave-bearing bails or members $d$ and $D'$, of cable and drum $E\ e$, respectively, and cable and drum $G$ and $g$, respectively, the arrangement of parts being substantially as shown, for the purpose specified.

In testimony whereof I sign this specification, in the presence of two witnesses, this 25th day of October, 1894.

GURDON H. WILLIAMS.

Witnesses:
 C. H. DORER,
 L. WARD HOOVER.